(12) United States Patent
Brown et al.

(10) Patent No.: US 7,282,187 B1
(45) Date of Patent: Oct. 16, 2007

(54) RECOVERY OF METAL VALUES

(75) Inventors: Patrick M. Brown, Exton, PA (US);
Robert A Hard, Hallowell, ME (US);
Donna D. Harbuck, Salt Lake City, UT (US); G. Kyle Green, Sandy, UT (US)

(73) Assignee: Caboi Corporation, Boston, MA (US)

( * ) Notice: Subject to any disclaimer, the term of this patent is extended or adjusted under 35 U.S.C. 154(b) by 0 days.

(21) Appl. No.: 08/621,631

(22) Filed: Mar. 26, 1996

(51) Int. Cl.
*C01F 17/00* (2006.01)
*C01F 15/00* (2006.01)
*C01G 25/00* (2006.01)
*C01G 35/00* (2006.01)
*C01G 33/00* (2006.01)
*C01G 43/00* (2006.01)

(52) U.S. Cl. .................. 423/21.5; 423/8; 423/10; 423/63; 423/70; 423/658.5

(58) Field of Classification Search .............. 423/21.5, 423/63
See application file for complete search history.

(56) References Cited

U.S. PATENT DOCUMENTS

| | | | |
|---|---|---|---|
| 2,767,047 A | 10/1956 | Wilhelm et al. | 23/23 |
| 2,953,453 A | 9/1960 | Foos | 75/121 |
| 2,962,372 A | 11/1960 | Foos et al. | 75/121 |
| 3,117,833 A | 1/1964 | Pierret | 23/19 |
| 3,300,297 A | 1/1967 | Field | 75/24 |
| 3,658,511 A | 4/1972 | Gustison | |
| 3,712,939 A | 1/1973 | Capps et al. | |
| 3,972,710 A | 8/1976 | Meyer | |
| 4,155,982 A | 5/1979 | Hunkin et al. | |
| 4,164,417 A | 8/1979 | Gustison | |
| 4,233,278 A | 11/1980 | Korchnak | |
| 4,234,555 A | 11/1980 | Pulley et al. | |
| 4,278,640 A | 7/1981 | Allen et al. | |
| 4,293,528 A | 10/1981 | Paul | |
| 4,309,389 A | 1/1982 | Meyer | |
| 4,320,093 A | 3/1982 | Volesky et al. | |
| 4,412,861 A | 11/1983 | Kreuzmann | |
| 4,446,115 A | 5/1984 | Endo et al. | |
| 4,446,116 A | 5/1984 | Krismer et al. | |
| 4,451,438 A | 5/1984 | Floeter et al. | |
| 4,477,416 A | 10/1984 | Goddard | |
| 4,536,034 A | 8/1985 | Otto, Jr. et al. | |
| 4,624,703 A * | 11/1986 | Vanderpool et al. | 423/21.1 |
| 4,654,200 A | 3/1987 | Nirdosh et al. | |
| 4,663,130 A | 5/1987 | Bergman et al. | |
| 4,673,554 A | 6/1987 | Niwa et al. | |
| 4,695,290 A | 9/1987 | Kindig et al. | |
| 4,718,996 A | 1/1988 | Vanderpool et al. | |
| 4,743,271 A | 5/1988 | Kindig et al. | |
| 4,753,033 A | 6/1988 | Kindig | |
| 4,778,663 A | 10/1988 | Rickelton | |
| 4,808,384 A | 2/1989 | Vanderpool et al. | |
| 4,923,507 A | 5/1990 | Silva, Filho | |

(Continued)

OTHER PUBLICATIONS

Solvent Extraction Principles and Applications to Process Metallurgy, Part II.

(Continued)

*Primary Examiner*—Wayne A. Langel

(57) ABSTRACT

A process for selectively extracting metal values, including, uranium, thorium, scandium and zirconium, from starting materials which include the metal values. The process is particularly well suited to extracting metal and recovering metal values from tantalum/niobium production process ore residues.

13 Claims, 2 Drawing Sheets

U.S. PATENT DOCUMENTS

| | | | |
|---|---|---|---|
| 5,015,447 A | * | 5/1991 | Fulford et al. ............. 423/21.5 |
| 5,023,059 A | | 6/1991 | Bielecki et al. |
| 5,084,253 A | | 1/1992 | Pollock et al. |
| 5,209,910 A | | 5/1993 | Bludssus et al. |
| 5,273,725 A | | 12/1993 | Carlson |
| 5,384,105 A | | 1/1995 | Carlson |
| 5,437,848 A | | 8/1995 | Hard |
| 5,492,680 A | * | 2/1996 | Odekirk ..................... 423/21.5 |
| 5,531,970 A | * | 7/1996 | Carlson .......................... 423/3 |

OTHER PUBLICATIONS

Radioactive Waste Disposal in the Shiprock-Type Uranium Milling Flowsheet by K.E. Tame, E.G. Valdez, and J.B. Rosenbaum.

Radium Removal from Uranium Ores and Mill Tailings by S.R. Borrowman and P.T. Brooks.

The Purification of Inorganic Acids by the Amine Liquid Ion Exchange Process by D.W. Agers, J.E. House, J.L. Drobnick and C.J. Lewis.

Scandium Recovery From a Tantalum Waste Residue: A Status Report by D.D. Harbuck and G.R. Palmer, U.S. Bureau of Mines.

Evaluation of Scandium Oxide Production from Tantalum Processing Waste, Aug. 1993, edited by G. Kyle Green.

*Scandium Saves Aluminum*, Rare-earth Information Center Insight, Ames Laboratory Institute for Physical Research and Technology, vol. 6, No. 4, Apr. 1, 1993.

*Co-extraction of uranium and thorium*, by G.M. Ritcey and B.H. Lucas, Apr. 1972, Journal of Metals, pp. 39-44.

"Extractive metallurgy of niobium, tantalum and vanadium," by C.K. Gupta, pp. 405-444.

* cited by examiner

RECOVERY OF METAL VALUES

FIELD OF THE INVENTION

The present invention relates to a method for extracting and recovering metal values from metal containing materials. The method is particularly well-suited for use in extracting and recovering radioactive metal values from tantalum and niobium containing materials, e.g., ores, ore residues and slags.

BACKGROUND

The production of many commercially valuable metals, or metal compounds, from mineral ores includes a process step of digesting the ore with a mineral acid such as hydrofluoric acid. The digesting step is utilized to convert metal species in the mineral ore to metal species which are soluble in aqueous systems so that the metal values may be separated out by selective extractions or the like.

In a typical process, mineral ore concentrates containing tantalum and niobium are conventionally decomposed with hydrofluoric acid (HF) or mixtures of hydrofluoric acid and sulfuric acid ($HF/H_2SO_4$). The tantalum and niobium heptafluoro complexes formed are then purified by solvent extraction and separated.

More particularly, in a conventional process for producing tantalum pentoxide ($Ta_2O_5$), the tantalum fraction from the ore decomposition is stripped into the aqueous phase and tantalum pentoxide is precipitated using ammonia and recovered by filtration. Niobium pentoxide may be produced in a similar fashion.

Commercial schemes for the extraction and separation of tantalum and niobium values from beneficiated ores or from tin slags are described in detail in U.S. Pat. Nos. 2,767,047; 2,953,453; 2,962,372; 3,117,833; 3,300,297; 3,658, 511; 3,712,939; 4,164,417 and 5,023,059. A general discussion of other ore process schemes is found in Extractive Metallurgy of Niobium, Tantalum and Vanadium, INTERNATIONAL METALS REVIEW, 1984, VOL. 29, NO. 26, BB 405–444 published by The Metals Society (London) and in The Encyclopedia of Chemical Technology, 3rd Ed., Vol. 22 pp. 547–550.

Commercial processing of ores and slags, for example by the processes outlined above, results in ore residues having concentrated levels of metal values not extracted in, or separated by, the processing steps. In particular, ore residues from commercial processes typically have concentrated levels of radioactive metal values. It would be desirable to have a process for separating and recovering the radioactive metal values from ore residues for possible sale, and to generate a residue which may be handled and disposed of as non-radioactive waste. The present invention provides a process which achieves this and other advantageous results.

SUMMARY OF THE INVENTION

The present invention provides a process for selectively extracting metal values from a starting material which includes one or more solubilizable metal values comprising:

separating and removing fluorine values from the starting material;

leaching the remaining material to solubilize metal values contained in the remaining material and generate an aqueous solution comprising said solubilized metal values; and extracting a solubilized metal value from said aqueous solution. In a preferred embodiment, the present invention provides a process for selectively extracting metal values, including, uranium, thorium, scandium and/or zirconium, from metal containing materials. As used herein the term "metal containing materials" includes naturally occurring ores, ore residues and/or slags which contain metal values. The process is particularly well suited to extracting metal and recovering metal values from tantalum/niobium production process ore residues.

The process of the present invention may further include process steps for processing the resulting residue after the selective extraction of the metal values. Further, the extracted metal values may be purified by additional process steps. In addition, process steps may be included to treat the metal containing material prior to extraction of the metal values.

An advantage of the process of the present invention is that the process may be utilized to selectively extract metal elements from metal containing materials such as ore residues.

Another advantage of the process of the present invention is that the process may be utilized to extract radioactive metal values from metal containing materials such as ore residues to produce a resulting residue with lowered levels of radioactivity.

DETAILED DESCRIPTION OF THE INVENTION

The present invention provides a process for selectively extracting uranium, zirconium, thorium and/or scandium from metal containing materials such as ore residues and in particular sulfate leach liquors produced from ore residues. The process of the present invention is particularly advantageous for processing ore residues comprising fluoridated metal values, such as ore residues from a tantalum/niobium production process, which heretofore have been difficult to process due to their fluorine content. In particular, it has been difficult to solubilize metal values from ore residues comprising fluoridated metal values due to the presence of fluorine and the insolubility of fluoride compounds. In a preferred embodiment of the process of the present invention, fluorine values are removed from an ore residue, the remaining ore residue is leached to solubilize metal values contained in the ore residue and then solubilized metal values are selectively extracted from the leach liquor.

The process of the present invention is described in further detail in the following paragraphs with reference to an embodiment of the process of the present invention wherein the starting material is an ore residue. As will be realized by those of ordinary skill in the art, the process of the present invention may be advantageously utilized to recover metal values from starting metal containing materials other than ore residues, therefore the following description should not be construed to limit the scope of the present invention.

Figure 1:
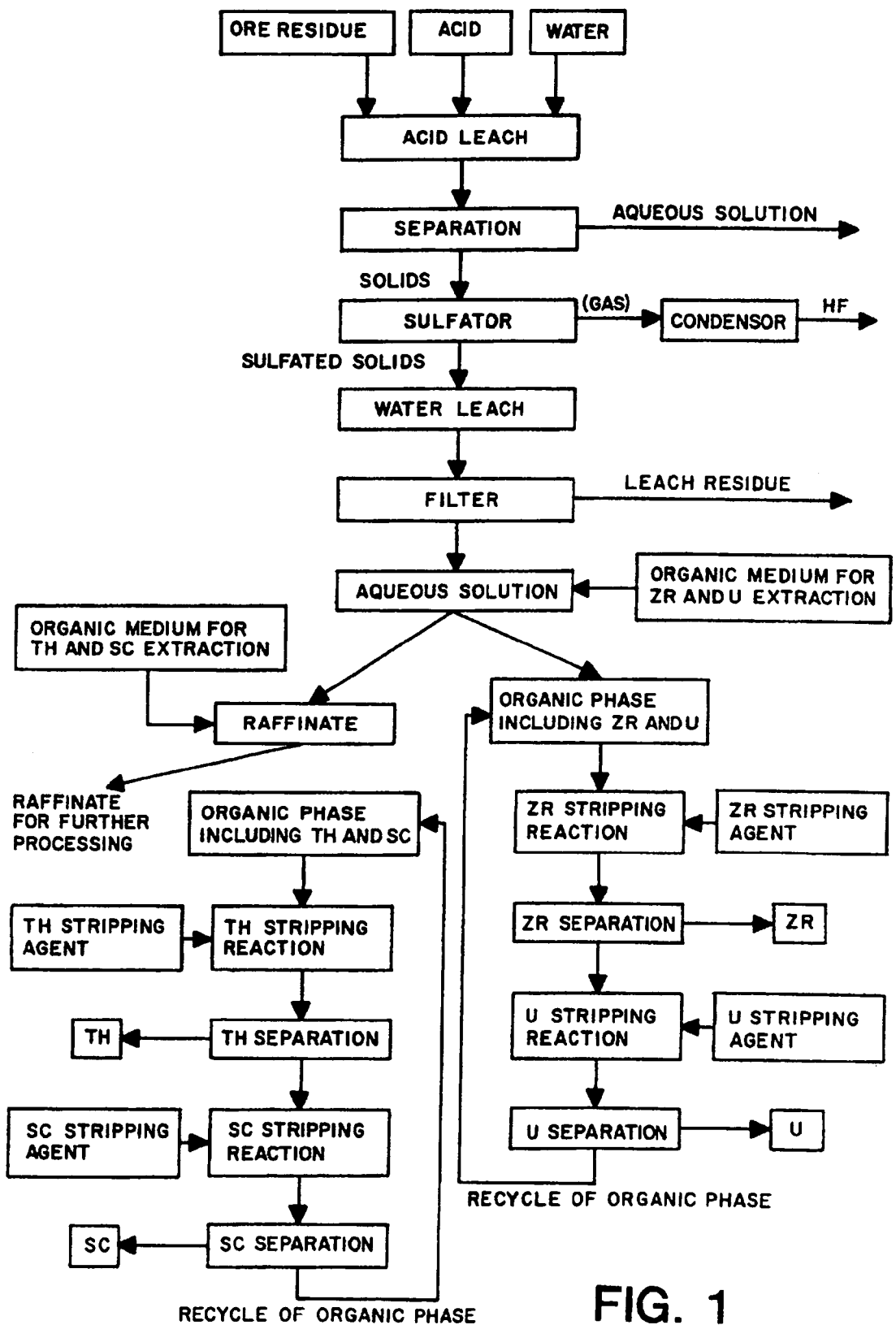
FIG. 1 is a process flowsheet for an embodiment of a process of the present invention.

An embodiment of a process of the present invention is shown schematically in FIG. 1. As shown in FIG. 1, in a first stage a starting ore residue, such as an ore residue from a tantalum/niobium production process, is leached with acid.

When the starting ore residue includes tantalum and niobium metal values, the acid leach preferably solubilizes the tantalum and niobium metal values. After acid leaching, a separation is performed to separate the remaining ore residue solids from the aqueous leach solution. The aqueous leach solution may be further processed to recover tantalum and niobium metal values.

The remaining ore residue solids from the acid leach are then reacted in a second stage with acids, preferably in a rotary kiln at an elevated temperatures, to convert metal-values in the ore residue to metal value-sulfate compounds. Gas released during sulfation may be passed through a condenser and recovered as HF (where the starting ore residue includes fluoridated metal values). The sulfated ore residue solids are then leached with water, and filtered to separate the aqueous solution from the remaining leach residue. The leach residue (solids) may be treated and further processed to recover metal values and/or for further disposal. The resulting aqueous solution is further processed to separate and recover zirconium, uranium, thorium and scandium metal values.

The portion of the aqueous solution resulting from the second stage which is not removed by the selective solvents for Zr, U, Th and Sc (i.e. the raffinate remaining after Zr, U, Th, and Sc have been stripped) will comprise remaining elements of the starting sulfated ore residue which were solubilized during water leaching including for example Fe, Al, Ta and Nb. Solvent extraction may be carried out to remove the tantalum, niobium or other metal values. The subsequent raffinate after removal of tantalum, niobium and/or other predetermined metal values may be treated with lime to precipitate remaining metals as hydroxides for disposal.

These process steps are explained in more detail in the following paragraphs wherein the following terminology is utilized to follow the starting material through the process: starting ore residue—>remaining or undissolved ore residue (the unsolubilized portion of the starting ore residue after treatment to remove Tantalum and Niobium Values)—>resulting ore residue (after treatment to remove Fluoride metal values)—>leftover ore residue solids.

Removal of Tantalum and Niobium Values

Tantalum and niobium values may be removed from a starting ore residue, such as a fluoridated ore residue from a commercial tantalum/niobium production process, by the following process:

reacting the starting ore residue with a solution of a mineral acid for a period of time, and under temperature and pressure conditions sufficient to generate a tantalum/niobium concentrate in solution and a remaining ore residue; and separating the remaining (undissolved) ore residue from the accompanying leach solution.

In addition, the tantalum/niobium concentrate solution may be further treated to recover tantalum and niobium. More particularly, the tantalum/niobium concentrate solution separated after the initial reaction of the ore residue with a mineral acid may be further treated to recover tantalum and niobium by further concentrating the solution through solvent extraction and then further processing solution as part of a tantalum/niobium production process.

Suitable mineral acids for use in reacting with the starting ore residue to generate a tantalum/niobium concentrate in solution include: sulfuric acid and mixtures of sulfuric acid and other minerals acids, e.g. hydrofluoric acid. The reaction of the starting ore residue with the mineral acid solution may be performed under ambient pressure conditions and at a temperature of 80 to 100° C. The solids are preferably acid leached at an acid concentration of 9 to 30%, by weight in the solution.

This mixture is then heated to approximately 90° C. for 30 minutes. The mixture is then cooled and filtered. These process steps will generally retrieve, in the filtrate (the solution formed by the acid leach of the starting ore residue) a substantial portion, e.g. up to about 70%, by weight, or more of the tantalum and niobium present in the ore residue prior to this treatment. The tantalum and niobium may be concentrated through solvent extraction and the concentrate further processed as part of a tantalum/niobium production process.

The remaining (undissolved) ore residue (the unsolubilized portion of the starting ore residue after treatment to remove Ta and Nb values) may be separated and/or dried by any means known in the art.

Removal of Fluoride Values

Fluoride values may be removed from the remaining ore residue by the following process:

reacting the remaining ore residue with mineral acid or minteral acid mixture comprising sulfuric acid, preferably concentrated sulfuric acid, for a period of time, and under temperature and pressure conditions sufficient to liberate hydrogen fluoride gas and to generate a sulfated ore residue. The hydrogen fluoride gas produced may be recovered by means known to the art.

The generation of the sulfated ore residue and liberation of hydrogen fluoride gas may be performed under ambient pressure conditions and at a temperature of 150° to 300° C., preferably 250° to 300° C. Generally the solids may be leached using 1.25 to 1.75 pounds of concentrated sulfuric acid per pound of solid. Preferably the sulfation process steps comprise adding 1.25 pounds of concentrated sulfuric acid per pound of starting solids and heating the mixture to 250° C. to liberate hydrogen fluoride gas. Hydrogen fluoride gas produced in generating the sulfated solids may be condensed and collected in solution form by means known to the art.

Leaching of the Resulting Ore Residue(after Treatment to Remove Fluoride Values)

After removal of fluoride, the resulting sulfated ore residue is leached with water to generate an aqueous solution comprising solubilized metal values. An aqueous solution of metal values including one or more of: uranium; zirconium; scandium; and/or thorium; may be produced from a sulfated ore residue including such metal value(s) by a process comprising:

reacting (leaching) the sulfated ore residue with water for a period of time, and under temperature and pressure conditions sufficient to generate an aqueous solution of the metal values; and filtering the aqueous solution to separate leftover ore residue solids from the aqueous solution. The solubilized metal values may then be selectively extracted from the aqueous solution for example, as set forth below.

The step of reacting the sulfated ore residue with water, generally referred to as "leaching" by those of ordinary skill in the art, may be performed under ambient pressure conditions and at a temperature of at least 25 to approximately 100° C., preferably 60 to 90° C. The solids are preferably leached at a concentration of 5 to 50%, by weight, preferably 10 to 25%, by weight in water. More preferably, the sulfated solids residue is leached at 40% solids, by weight, with water and then filtered to generate the feed solution for the subsequent solvent extraction and recovery of the uranium, zirconium, scandium and thorium.

Generally, leaching, preferably with agitation to achieve a substantially homogeneous solution, for 30 to 1080 minutes (0.5 to 18 hours) is sufficient to generate an aqueous solution of metal values including uranium, zirconium, thorium and/or scandium.

Filtering of the aqueous solution may be performed in any manner known in the art. Suitable filtering methods include, but are not limited to, belt filtration, rotary filtration, centrifuge filtration, drum filtration, counter current decantation, and filter pressing. The filtrate will be an aqueous solution comprising metal values, including uranium, zirconium, thorium and/or scandium.

The leftover ore residue solids remaining after filtration may be leached with an EDTA solution to remove residual radium, thorium and uranium and then filtered. The filtered solids will generally comprise a non-radioactive landfillable residue. The filtrate solution may be treated with barium chloride and then sulfuric acid to produce barium sulfate with lattice substituted radium. Any thorium and uranium remaining may be precipitated in the same fashion. The precipitated radioactive concentrate comprising radium may be suitable for use in the medical arts.

Selective Extraction of Solubilized Metal Values

Solubilized metal values in the aqueous solution generated by leaching may be selectively extracted from the aqueous solution and recovered as set forth below. In a preferred process of the present invention, the aqueous solution undergoes cation and anion extractions in two separate process streams. The selective extraction of zirconium, uranium, thorium and scandium may be accomplished by the following process.

According to an embodiment of the present invention, zirconium and uranium are selectively, sequentially separated from an aqueous solution including zirconium and uranium by a process comprising:

contacting said aqueous solution with an organic medium which includes a diluent and an extractant, and preferably further includes a modifier, said diluent being immiscible with said aqueous solution thereby producing an organic phase comprising zirconium and uranium and an aqueous raffinate phase depleted in zirconium and uranium separating said organic phase from said raffinate phase;

stripping zirconium from said organic phase by contacting said organic phase with a zirconium stripping agent, said stripping forming a zirconium phase, preferably a zirconium aqueous phase, comprising zirconium from said organic phase and a resultant organic phase comprising uranium, said diluent and said extractant; and stripping uranium from said resultant organic phase by contacting said resultant organic phase with a uranium stripping agent, said stripping forming a uranium phase, preferably a uranium aqueous phase, comprising uranium from said resultant organic phase and a final organic phase comprising said diluent and said extractant.

When said zirconium phase is a solid, an aqueous phase comprising said zirconium stripping agent is also produced. Similarly, when said uranium phase is a solid, an aqueous phase comprising said uranium stripping agent is also produced.

Suitable extractants for use in forming an organic phase comprising at least a portion of said zirconium and at least a portion of said uranium from said aqueous solution include extractants capable of selectively extracting zirconium and uranium. Suitable extractants include, but are not limited to, organic amines, in particular non-aqueous, non-soluble, long chain alkanolamines, preferably long chain tertiary alkanolamines, such as ALAMINE 336 alkanoamine (produced and sold by Henkel Corporation, Kankakee, Ill.).

The choice of diluent will depend, in part, on the extractant utilized. Suitable diluents include diluents which are compatible with the organic media and will not gel, or otherwise become so viscous as to be difficult to pump, after loading of the organic media. In particular, suitable diluents for use with organic amine extractants include, but are not limited to, diluents low in aromatic content, including SX12 diluent (manufactured and sold by Phillips 66 Co., Bartlesville, Okla.), kerosene, EXXAL 100 diluent (manufactured and sold by Exxon Chemical Co., Houston, Tex.) and other $C_9$ and above, preferably $C_9$–$C_{20}$ alkane based diluents.

As used in the foregoing description, a "modifier" is a composition which when added to the organic medium will enhance the solvent extraction, for example by enhancing the separation between the organic phase and the raffinate while avoiding emulsion. The choice of modifier will depend, in part, on the extractant and diluent utilized in the organic medium. Suitable modifiers for use with an organic amine extractant and an aliphatic diluent include, but are not limited to, normally branched tridecyl alcohol.

The organic medium preferably comprises:

5 to 15%, by weight, more preferably 10%, by weight, of the organic media, an extractant;

0 to 3%, by weight, more preferably 1 to 3%, by weight, of the organic media, a modifier, and 72 to 92%, by weight, of the organic media, a diluent.

A preferred organic medium comprises: 5 to 15%, more preferably 10%, by weight, of the organic media, ALAMINE 336 alkanoamine as the extractant; 1 to 3%, by weight, more preferably 3%, by weight, of the organic media, tridecyl alcohol as the modifier; and the remainder diluent Suitable zirconium stripping agents for use in generating a zirconium aqueous phase comprising zirconium from said organic phase include: mineral acids, such as hydrochloric acid (HCl), sulfuric acid ($H_2SO_4$); and nitric acid ($HNO_3$). A preferred zirconium stripping agent is 10%, by weight, HCl in water. The zirconium stripping may be conducted at ambient temperature and pressure, for a a contact time sufficient to transfer zirconium to the aqueous phase. In a preferred embodiment of the process of the present invention the zirconium aqueous phase and the resultant organic phase are substantially immiscible and therefore may be easily separated, for example by decantation.

Suitable uranium stripping agents for generating a uranium aqueous phase comprising uranium, include: brine solutions, carbonate solutions, ammonia hydroxide ($NH_4OH$) solutions, acidic solutions with a molarity of greater than 3M for acids such as hydrochloric acid (HCl), sulfuric acid ($H_2SO_4$) and the like. A suitable brine solution comprises a mineral salt and water, and may further comprise a mineral acid. Suitable mineral salts include: sodium chloride and potassium chloride. Suitable mineral acids include: sulfuric acid ($H_2SO_4$) and hydrochloric acid (HCl). A preferred brine solution comprises: sodium chloride at a concentration of 1 mole/liter and sulfuric acid at a concentration of 0.1 to 1.0 mole/liter. A suitable carbonate solution comprises a carbonate and water. Suitable carbonates include alkaline carbonates such as sodium carbonate, ammonium carbonate and potassium carbonate. A preferred carbonate solution comprises: 5 to 10%, by weight, sodium carbonate in water. The uranium stripping agent contacts the loaded organic phase at ambient temperature for a period of time sufficient to transfer uranium to the aqueous phase. In a preferred embodiment of the process of the present invention the uranium aqueous phase and the resultant organic phase are substantially immiscible and therefore may be easily separated, for example by decantation.

The final organic phase remaining after extraction of zirconium and uranium may be recycled into the process.

As will be understood by those of ordinary skill in the art from the foregoing description, the raffinate includes metal values which are not extracted into the organic phase through contact with the organic medium. Thus, the raffinate will include solubilized metal values from the leached ore residue, including thorium and scandium. Thorium and scandium may be selectively extracted from the raffinate by the process described below.

According to an embodiment of the present invention, thorium and scandium are selectively sequentially separated from an aqueous solution including thorium and scandium, such as the raffinate from the zirconium and uranium extraction steps, by a process comprising:

contacting said aqueous solution with an organic medium which includes a diluent and an extractant, and preferably further includes a modifier, said diluent being immiscible with said aqueous solution thereby producing an organic phase comprising thorium and scandium and an aqueous raffinate phase depleted in thorium and scandium;

separating said organic phase from said raffinate phase;

extracting thorium from the organic phase, preferably by stripping thorium from said organic phase by contacting said organic phase with a thorium stripping agent, said stripping forming a thorium phase, preferably a thorium aqueous phase, comprising thorium and a resultant organic phase comprising scandium, said diluent and said extractant; and extracting scandium from the thorium depleted organic phase, preferably by stripping scandium from said resultant organic phase by contacting said resultant organic phase with a scandium stripping agent, said stripping forming a scandium phase, preferably a scandium aqueous phase, comprising scandium and a final organic phase comprising said diluent and said extractant.

When said thorium phase is a solid, an aqueous phase comprising said thorium stripping agent is also produced. Similarly, when said scandium phase is a solid, an aqueous phase comprising said scandium stripping agent is also produced.

Suitable extractants for use in forming an organic phase comprising at least a portion of said thorium and at least a portion of said scandium from said aqueous solution include extractants capable of selectively extracting thorium and scandium. Preferred extractants include: DEPHA (Di 2-ethylhexylphosphoric acid); tributyl phosphate (TBP); PC88A phosphonic acid (manufactured and sold by Diahachi Chemical, Japan) IONQUEST 801 phosphonic acid (manufactured and sold by Albright & Wilson Associates, Richmond, Va.); and mixtures thereof.

The choice of diluent will depend, in part, on the extractant utilized. Suitable diluents include diluents which are compatible with the organic media and will not gel, or otherwise become so viscous as to be difficult to pump, after loading of the organic media. In particular, suitable diluents for use with organic thorium and scandium extractants include, but are not limited to, non-soluble long chain ($C_9$–$C_{16}$) aliphatic diluents, kerosene and SX-12 diluent.

As used above and in the foregoing description, a "modifier" is a composition which when added to the organic medium will enhance the solvent extraction, for example by enhancing the separation between the organic phase and the raffinate. The choice of modifier will depend, in part, on the extractant and diluent utilized in the organic medium. Suitable modifiers for use with organic thorium and scandium extractants and an aliphatic diluent include, but are not limited to, tridecyl alcohol, tributyl phosphate and isodecyl alcohol.

The organic medium preferably comprises:

5 to 15%, by weight, of the organic media, an extractant;
0 to 6%, by weight, of the organic media, a modifier, and
79 to 89%, by weight, of the organic media, a diluent.

A preferred organic medium comprises:

5 to 15%, by weight, more preferably 5%, by weight, of the organic media, DEPHA;
1 to 5%, by weight, more preferably 5%, by weight, of the organic media, tributyl phosphate;
0.1 to 1%, by weight, more preferably 1%, by weight, of the organic media, tridecyl alcohol; and
79 to 93.9%, by weight, of the organic media, an aliphatic diluent.

Suitable thorium stripping agents for use in generating a thorium aqueous phase comprising thorium from said organic phase include: mineral acids, such as sulfuric acid ($H_2SO_4$), hydrochloric acid (Hcl) and nitric acid ($HNO_3$). A preferred thorium stripping agent for generating the thorium aqueous phase is a solution comprising 250 grams/liter sulfuric acid in water. The thorium stripping may be conducted at ambient temperature and pressure, for a period of time sufficient to extract thorium to the aqueous phase. In a preferred embodiment of the process of the present invention, the thorium aqueous phase, and the resultant organic phase are substantially immiscible and therefore may be easily separated.

Suitable scandium stripping agents for generating the scandium phase comprising scandium include: aqueous caustic solutions (aqueous hydroxide solutions). Suitable caustics include: sodium hydroxide and sodium carbonate. A preferred aqueous caustic solution for use as a stripping agent is a 3 molar (M) solution of sodium hydroxide. The scandium stripping may be conducted at ambient temperature and pressure, for a contact time sufficient to transfer scandium to the scandium phase, which for many embodiments of the process of the present invention will be a solid comprising scandium. In a preferred embodiment of the process of the present invention, the scandium phase, and the resultant organic phase are substantially immiscible and therefore may be easily separated.

The final organic phase remaining after extraction of thorium and scandium is preferably recycled into the process.

The raffinate formed in the thorium and scandium extraction process includes metal values which are not extracted into the organic phase. Thus, the raffinate will include remaining solubilized metal values from the leached ore residue and may be utilized to produce a concentrate of the remaining metal values. In general, the raffinate may comprise elements of the starting sulfated ore residue, including Fe, Al, Ta and/or Nb. Solvent extraction, for example with an amine, may be carried out to extract the tantalum and niobium from the raffinate formed in the thorium and scandium extraction process. The remaining solution may be treated with lime to precipitate the metals as hydroxide for disposal.

The zirconium, uranium, thorium and scandium metal values extracted in the process of the present invention may be recovered in purified form by processes which include forming a precipitate which includes the metal value, separating the precipitate and calcining the precipitate to produce an metal oxide. A particular process for each metal value is set forth in the following paragraphs.

A purified zirconium oxide ($ZrO_2$) may be produced by a process comprising:

reacting the zirconium aqueous phase with a basic solution to generate a zirconium oxide precursor, separating the precursor from the resulting solution; and converting the precursor precipitate to a purified zirconium oxide.

A preferred basic solution is an hydroxide solution, more preferably ammonium hydroxide, which will generate a zirconium hydroxide precipitate which may be purified by calcining at temperatures above 100° C., preferably 120° to 400° C.

A purified uranium oxide ($UO_2$) may be produced by a process comprising:

reacting the uranium aqueous phase with a basic solution to generate a uranium oxide precursor;

separating the precursor from the resulting solution; and converting the precursor to a purified uranium oxide.

A preferred basic solution is an hydroxide solution, more preferably ammonium hydroxide, which will generate an ammonium diurinate precipitate which may be purified by calcining at temperatures above 100° C., preferably 120 to 400° C.

A purified thorium fluoride ($ThF_4$) may be produced by a process comprising:

reacting the thorium aqueous phase with an acidic solution to generate a thorium fluoride precursor;

separating the thorium fluoride precursor from the resulting solution, for example by filtration, and converting the precursor to a purified thorium fluoride.

A preferred acidic solution is a hydrofluoric acid solution which will generate a thorium fluoride precipitate which may be separated by filtration and purified by drying.

In an embodiment of the process of the present invention the scandium phase is in the form of a scandium hydroxide solid. A purified scandium oxide may be produced by a process comprising:

calcining the scandium hydroxide to produce scandium oxide.

When the scandium phase is an aqueous phase, a purified scandium product may be produced by a process comprising:

reacting the scandium aqueous phase with an acidic solution to generate a scandium containing precursor;

separating the precursor from the resulting solution, and converting the precursor to a purified scandium product.

As will be realized from the foregoing description, an embodiment of the process of the present invention may be described as a process for recovering one or more predetermined metal values, selected from the group consisting of zirconium, uranium, thorium and scandium, comprising:

reacting a starting ore residue with a solution of a mineral acid for a period of time, and under temperature and pressure conditions sufficient to solubilize tantalum and niobium into solution and thereby generate a solution comprising tantalum and niobium, and a remaining ore residue;

separating and drying the remaining ore residue;

reacting the remaining ore residue with mineral acid for a period of time, and under temperature and pressure conditions sufficient to liberate hydrogen fluoride gas and to generate a sulfated ore residue;

reacting (leaching) the sulfated ore residue with water for a period of time, and under temperature and pressure conditions sufficient to generate an aqueous solution comprising at least one of the predetermined metal values; and recovering the predetermined metal value(s) from the aqueous solution of metal values. Recovery of the predetermined metal value from the aqueous solution may be accomplished by the techniques described herein. It is preferable to perform the extraction and stripping in a sequential manner starting with the loading and separation of zirconium and uranium and then continuing with the loading and separation of thorium and scandium to minimize interference by one or more of these metal values in the extraction of another one of these metal values. Performing the extraction and stripping in a sequential manner is particularly preferred if the aqueous solution is believed to include more than one metal value selected from the group of zirconium, uranium, thorium and scandium.

An embodiment of the process of the present invention, starting from an ore residue wherein the predetermined metal values comprise zirconium, uranium, thorium and scandium, may be described as a process comprising:

reacting a starting ore residue with a solution of a mineral acid for a period of time, and under temperature and pressure conditions sufficient to solubilize tantalum and niobium into solution and thereby generate a solution comprising tantalum and niobium, and a remaining ore residue;

separating and drying the remaining ore residue;

reacting the remaining ore residue with mineral acid for a period of time, and under temperature and pressure conditions sufficient to liberate hydrogen fluoride gas and to generate a sulfated ore residue;

reacting (leaching) the sulfated ore residue with water for a period of time, and under temperature and pressure conditions sufficient to generate an aqueous solution of the metal values;

filtering said aqueous solution to separate remaining ore residue solids from the aqueous solution;

contacting said aqueous solution with an organic medium which includes a diluent and an extractant, and preferably further includes a modifier, said diluent being immiscible with said aqueous solution thereby producing an organic phase comprising zirconium and uranium and an aqueous raffinate phase depleted in zirconium and uranium;

separating said organic phase from said raffinate phase;

stripping zirconium from said organic phase by contacting said organic phase with a zirconium stripping agent, said stripping forming a zirconium phase, preferably a zirconium aqueous phase, comprising zirconium from said organic phase and a resultant organic phase comprising uranium, said diluent and said extractant; and stripping uranium from said resultant organic phase by contacting said resultant organic phase with a uranium stripping agent, said stripping forming a uranium phase, preferably a uranium aqueous phase, comprising uranium from said resultant organic phase and a final organic phase comprising said diluent and said extractant.

contacting said raffinate with another organic medium which includes a diluent and an extractant, and preferably further includes a modifier, said diluent being immiscible with said raffinate, thereby producing an organic phase comprising thorium and scandium and an another raffinate phase depleted in thorium and scandium;

separating said organic phase from said raffinate phase;

stripping thorium from said organic phase by contacting said organic phase with a thorium stripping agent, said stripping forming a thorium phase, preferably a thorium aqueous phase, comprising thorium from said organic phase and another resultant organic phase comprising scandium, said diluent and said extractant; and stripping scandium from said another resultant organic phase by contacting said resultant organic phase with a scandium stripping agent, said stripping forming a scandium phase, preferably a scandium aqueous phase, comprising scandium from said resultant organic phase, and another final organic phase comprising said diluent and said extractant.

Details relating to each of these process steps are provided in the foregoing description.

Further details and advantages of the present invention are provided by the following example.

EXAMPLE

Figure 2:
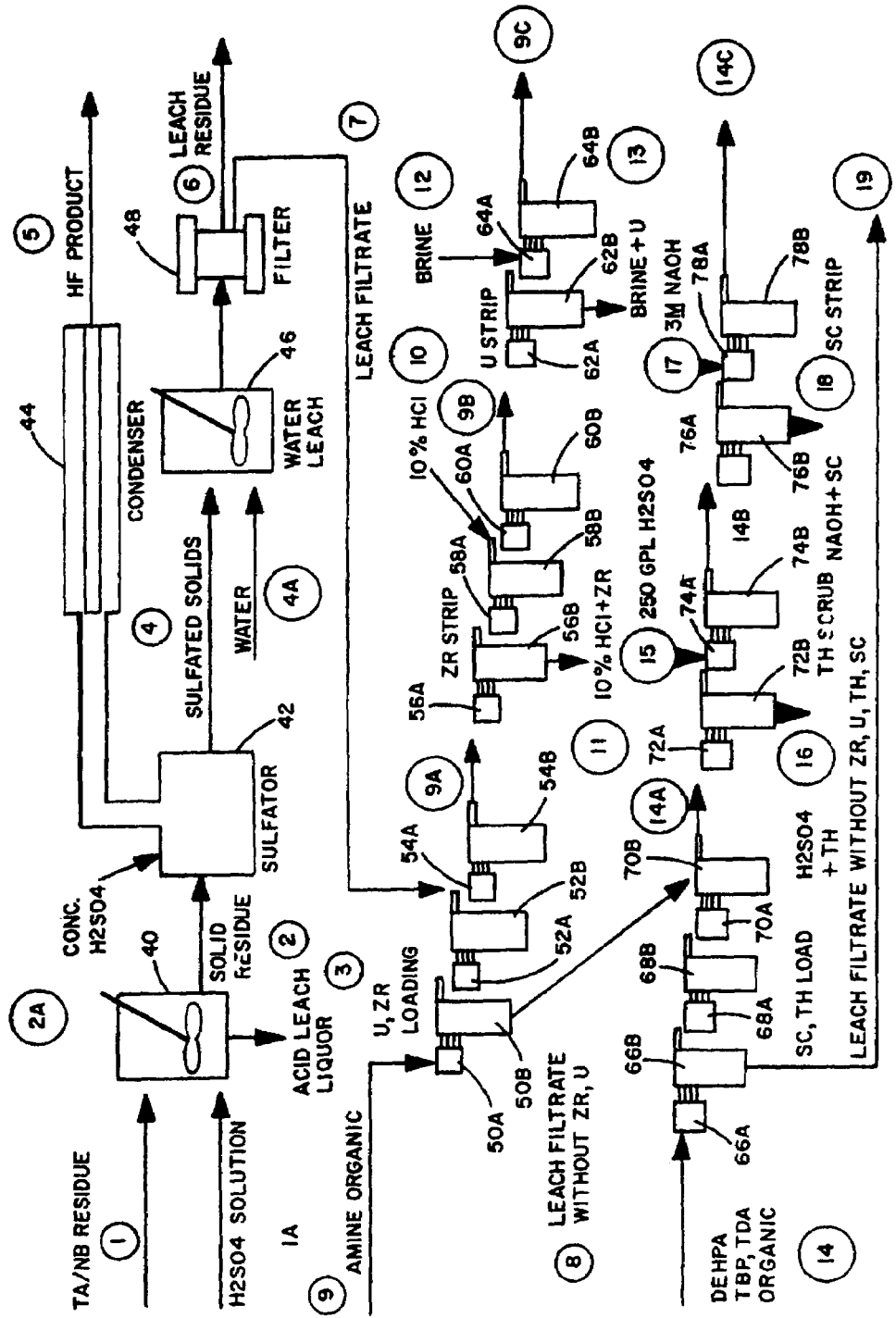
FIG. 2 is a process flowsheet for an embodiment of a process of the present invention described in the Example herein.

A process for recovering zirconium, uranium, thorium and scandium metal values from an ore residue, according to the present invention, was conducted in a laboratory to demonstrate the effectiveness and advantages of the process of the present invention. A process flowsheet/diagram for the process is depicted in FIG. 2.

The starting ore residue for the process was an ore residue from a tantalum/niobium production process. The ore residue was leached in a concentration of 20% solids on a dry basis with 3 grams concentrated sulfuric acid per gram ore residue, at 80° C. and 1 hour residence time under agitation in a 4000 milliliter beaker, 40 (labeled in FIG. 4). The aqueous leach solution was separated from the remaining solids utilizing a Buchner funnel. Then the remaining solids were combined with concentrated sulfuric acid (36 normal) at a concentration of 1.25 grams acid per gram of the dry residue and maintained at 250° C. for three hours residence time in an 1000 ml graphite crucible, 42, to sulfate the acid leached ore residue. Hydrofluoric acid in gaseous form was generated by the sulfation process and recovered by passing the gas through a condenser, 44.

The sulfated solids were then combined with water in a 1000 milliliter vessel, 46, at 40% solids concentration and maintained at 90° C. for a residence time of one hour. The leach liquor (aqueous solution) and leach residue were then separated by filtering, utilizing a Buchner filter, 48.

Extraction of zirconium, uranium, scandium and thorium was accomplished utilizing two solvent extraction circuits set-up in series. The reaction train for the extraction of zirconium and uranium utilized 8 pairs of interconnected mixer-settler vessels, 50(a&b)–64(a&b) arranged at varying heights so that an organic solution at the top of each vessel could flow downstream from the uppermost vessels, through the other seven vessels into the lowermost vessels. The vessel pairs were grouped into 3 groups comprising 3 vessel pairs, 3 vessel pairs and 2 vessel pairs. Loading of uranium and zirconium into an organic phase was accomplished in the uppermost three vessel pairs, 50(a&b)–54(a&b). The zirconium stripping reaction was performed utilizing three vessel pairs 56(a&b)–60(a&b) in the center of the train. The uranium stripping reaction was performed utilizing the remaining two lowermost vessel pairs 62(a&b) and 64(a&b).

The reaction train for the extraction of scandium and thorium utilized 7 pairs of vessels 66(a&b)–78(a&b) arranged at varying heights so that the organic solution from the top of each vessel could flow downstream from the uppermost vessels, through the other six vessels into the lowermost vessels. The vessels pairs were grouped into 3 groups comprising 3 vessel pairs, 2 vessel pairs and 2 vessel pairs. Loading of scandium and thorium into an organic phase was accomplished in the uppermost three vessel pairs, 66(a&b)–70(a&b). The thorium stripping reaction was performed utilizing two vessel pairs 72(a&b)–74(a&b) in the center of the train. The scandium stripping reaction was performed utilizing the remaining two lowermost vessel pairs 76(a&b) and 78(a&b).

The "a" mixer vessel in each pair of vessels was a 200 ml beaker and the "b" vessel in each pair of vessels was a 500 ml beaker.

The aqueous solution (leach filtrate) from water leach 46 was fed into vessel 54a. An organic solution comprising 10%, by weight, ALAMINE 336 alkanoamine in a diluent was fed into vessel 50a to contact the organic solution with the aqueous solution to generate an organic phase comprising uranium and zirconium metal values.

The organic phase including zirconium and uranium, flowed downstream into the second series of three vessels where zirconium was stripped from the solution. The stripping was accomplished by contacting the organic phase, including zirconium and uranium, with a solution of 10% hydrochloric acid. The hydrochloric acid was fed into vessel 60a and pumped upstream to contact the organic phase. The aqueous strip solution, including zirconium, was pulled off the bottom of vessel 56b.

The remaining organic phase including uranium, traveled downstream into the remaining pairs of vessels, in particular into vessel 62a for uranium stripping. Uranium stripping was accomplished by adding a brine or carbonate solution to vessel 64b and pumping the solution upstream. The aqueous strip solution, comprising uranium, was pulled from the bottom of vessel 62b. The remaining organic phase, after uranium stripping, was recycled into upstream vessel 54a.

The raffinate generated from the uranium and zirconium loading was pulled off the bottom of vessel 50b and added into the second reaction train for the extracting of scandium and thorium. The aqueous solution, without zirconium and uranium, was fed into vessel 70a and pumped upstream for contact with a scandium and thorium loading organic medium. The loading organic medium was a solution of DEHPA, TBP, TDA in a diluent and was added to vessel 66a for contacting with the aqueous solution, to extract scandium and thorium.

The organic phase comprising scandium and thorium flowed downstream from vessel 70b into vessel 72a, the first vessel in the second group of vessel pairs. Thorium was stripped from the solution by adding 250 grams per liter of sulfuric acid into vessel 74a and pumping the sulfuric acid upstream to contact the organic phase. The thorium strip solution, comprising thorium, was pulled from the bottom of vessel 72b.

The organic phase remaining comprising scandium passed downstream into the third set of vessel pairs for scandium stripping. The scandium stripping agent utilized (three molar sodium hydroxide) was added into vessel 78a and pumped upstream for contact with the organic phase. The strip solution, including scandium, was pulled from the bottom of the vessel 76b. The remaining organic phase coming off vessel 78b was recycled into vessel 70a.

The raffinate formed by the scandium and thorium loading, without zirconium, uranium, thorium and scandium, was pulled from the bottom of vessel 66b.

Samples were taken from an organic phase, aqueous solution or a solid phase at various points in the process and the sample's composition analyzed at the points indicated by the encircled numerals 1–19 in FIG. 2. The analyses were performed utilizing nuetron activation analysis (NAA), inductively coupled plasma (ICP) analysis and/or atomic absorption (AA) analysis utilizing conventional equipment and techniques known in the art. The results are presented below.

| | Point | | | | | | | | | |
|---|---|---|---|---|---|---|---|---|---|---|
| | 1 Feed % | 2 Acid Leach Residue % | 3 Acid Leach Liquor g/l | 4 Sulfated Solids % | 5 HF Product g/l | 6 Leach Residue % | 7 Leach Filtrate g/l | 8 Leach Filtrate w/o Zr g/l | 9 Amine Organic g/l | 10 HCl Strip g/l |
| Al | 5.2 | 5.19 | 1.28 | 2.9 | 0 | 2.39 | 14.9 | 14.9 | 0 | 0 |
| As | 0 | 0 | 0.051 | 0 | 0 | 0 | 0 | 0 | 0 | 0 |
| B | 0.35 | 0.35 | 0.154 | 0.18 | 0.02 | 0.3 | 0.03 | 0.03 | 0 | 0 |
| Ba | 0.44 | 0.55 | 1.63 | 0.32 | 0 | 0.75 | 0.008 | 0.008 | 0 | 0 |
| Ca | 13.12 | 11.7 | 2.43 | 7.5 | 0 | 16.5 | 0.947 | 0.947 | 0 | 0 |
| Cd | 0 | 0 | 0.006 | 0 | 0 | 0 | 0 | 0 | 0 | 0 |
| Co | 0.03 | 0 | 0.08 | 0 | 0 | 0 | 0 | 0 | 0 | 0 |
| Cr | 0.6 | 0.41 | 0.41 | 0.18 | 0 | 0.15 | 1 | 1 | 0 | 0 |
| Cu | 0 | 0 | 0.007 | 0 | 0 | 0 | 0 | 0 | 0 | 0 |
| F | 50 | 51.2 | 0.1 | 3 | 800 | 4 | 4 | 4 | 0 | 0 |
| Fe | 4.01 | 2.31 | 8.52 | 1.06 | 0 | 0.364 | 6.08 | 6.08 | 0 | 0 |
| Hf | 0.25 | 0.21 | 0.24 | 0.1 | 0 | 0.01 | 0.7 | 0.2 | 0 | 0 |
| Mg | 1.4 | 1.55 | 0.2 | 0.9 | 0 | 0.21 | 6.49 | 6.49 | 0 | 0 |
| Mn | 0.6 | 0.42 | 1.19 | 0.2 | 0 | 0.12 | 1.17 | 1.17 | 0 | 0 |
| Mo | 0 | 0 | 0.017 | 0 | 0 | 0 | 0 | 0 | 0 | 0 |
| Nb | 2.5 | 1.31 | 4.14 | 0.562 | 0 | 0.1 | 4.4 | 4.78 | 0 | 0 |
| Ni | 0 | 0 | 0 | 0 | 0 | 0 | 0 | 0 | 0 | 0 |
| P | 0 | 0 | 0 | 0 | 0 | 0 | 0 | 0 | 0 | 0 |
| Pb | 0 | 0 | 0 | 0 | 0 | 0 | 0 | 0 | 0 | 0 |
| Sc | 0.16 | 0.18 | 0.03 | 0.11 | 0 | 0.0020 | 0.71 | 0.71 | 0 | 0 |
| Sn | 0.6 | 0.68 | 0.15 | 0.3 | 0 | 0.5 | 0.11 | 0.11 | 0 | 0 |
| Ta | 2.03 | 1.47 | 3.78 | 0.554 | 0 | 0.005 | 4.95 | 4.95 | 0 | 0 |
| Th | 0.3 | 0.34 | 0.01 | 0.15 | 0 | 0.052 | 1.17 | 1.17 | 0 | 0 |
| Ti | 1.97 | 0.75 | 3.69 | 0.4 | 0 | 0.39 | 1 | 1 | 0 | 0 |
| U | 0.05 | 0.05 | 0.01 | 0.03 | 0 | 0.0001 | 0.3 | 0.001 | 0 | 0 |
| V | 0.09 | 0.1 | 0.15 | 0.066 | 0 | 0 | 0.6 | 0.685 | 0 | 0 |
| Zn | 0 | 0 | 0 | 0 | 0 | 0 | 0 | 0 | 0 | 0 |
| Zr | 6.5 | 7.52 | 0.15 | 3.22 | 0 | 0.3 | 18.9 | 0.0001 | 0 | 0 |
| $SO_4$ | 0 | 0 | 0 | 50 | 0.5 | 51 | 150 | 150 | 0 | 0 |
| Alamine 336 | 0 | 0 | 0 | 0 | 0 | 0 | 0 | 0 | 81 | 0 |
| Tridecyl Alcohol | 0 | 0 | 0 | 0 | 0 | 0 | 0 | 0 | 24.66 | 0 |
| diluent | 0 | 0 | 0 | 0 | 0 | 0 | 0 | 0 | 704.7 | 0 |
| HCl | 0 | 0 | 0 | 0 | 0 | 0 | 0 | 0 | 0 | 117 |

| | Point | | | | | | | | |
|---|---|---|---|---|---|---|---|---|---|
| | 11 Zr Loaded HCl g/l | 12 Brine Solution g/l | 13 U Loaded Brine Solution g/l | 14 DEHPA, TBP, TDA Organic g/l | 15 $H_2SO_4$ Solution g/l | 16 Th/Sc Strip Solution g/l | 17 2M NaOH Solution g/l | 18 $ScOH_3$ Strip Solution g/l | 19 Leach Filtrate w/o Zr, U, Th or Sc g/l |
| Al | 0.4 | 0 | 0 | 0 | 0 | 0 | 0 | 0 | 14.9 |
| As | 0 | 0 | 0 | 0 | 0 | 0 | 0 | 0 | 0 |
| B | 0 | 0 | 0 | 0 | 0 | 0 | 0 | 0 | 0.03 |
| Ba | 0 | 0 | 0 | 0 | 0 | 0 | 0 | 0 | 0.008 |
| Ca | 0 | 0 | 0 | 0 | 0 | 0 | 0 | 0 | 0.947 |
| Cd | 0 | 0 | 0 | 0 | 0 | 0 | 0 | 0 | 0 |
| Co | 0 | 0 | 0 | 0 | 0 | 0 | 0 | 0 | 0 |
| Cr | 0 | 0 | 0 | 0 | 0 | 0 | 0 | 0 | 1 |
| Cu | 0 | 0 | 0 | 0 | 0 | 0 | 0 | 0 | 0 |
| F | 0 | 0 | 0 | 0 | 0 | 0 | 0 | 0 | 4 |
| Fe | 0.058 | 0 | 0 | 0 | 0 | 0 | 0 | 0 | 6.08 |
| Hf | 0 | 0 | 0 | 0 | 0 | 0 | 0 | 0 | 0.01 |
| Mg | 0 | 0 | 0 | 0 | 0 | 0 | 0 | 0 | 6.49 |
| Mn | 0 | 0 | 0 | 0 | 0 | 0 | 0 | 0 | 1.17 |
| Mo | 0 | 0 | 0 | 0 | 0 | 0 | 0 | 0 | 0 |
| Nb | 0 | 0 | 0 | 0 | 0 | 0 | 0 | 0 | 4.76 |
| Ni | 0 | 0 | 0 | 0 | 0 | 0 | 0 | 0 | 0 |
| P | 0 | 0 | 0 | 0 | 0 | 0 | 0 | 0 | 0 |
| Pb | 0 | 0 | 0 | 0 | 0 | 0 | 0 | 0 | 0 |
| Sc | 0 | 0 | 0 | 0 | 0 | 0 | 0 | 0.71 | 0.001 |
| Sn | 0 | 0 | 0 | 0 | 0 | 0 | 0 | 0 | 0.11 |
| Ta | 0 | 0 | 0 | 0 | 0 | 0 | 0 | 0 | 4.95 |
| Th | 0 | 0 | 0 | 0 | 0 | 11.7 | 0 | 0 | 0.001 |
| Ti | 0 | 0 | 0 | 0 | 0 | 0 | 0 | 0 | 1 |

-continued

| | | | | | | | | | |
|---|---|---|---|---|---|---|---|---|---|
| U | 0 | 0 | 0.2 | 0 | 0 | 0 | 0 | 0 | 0.001 |
| V | 0.03 | 0 | 0 | 0 | 0 | 0 | 0 | 0 | 0.685 |
| Zn | 0 | 0 | 0 | 0 | 0 | 0 | 0 | 0 | 0 |
| Zr | 51 | 0 | 0 | 0 | 0 | 0 | 0 | 0 | 0.05 |
| SO$_4$ | 0 | 10.1 | 10.1 | 0 | 250 | 250 | 0 | 0 | 150 |
| Alamine 336 | 0 | 0 | 0 | 0 | 0 | 0 | 0 | 0 | 0 |
| Tridecyl Alcohol | 0 | 0 | 0 | 8.1 | 0 | 0 | 0 | 0 | 0 |
| diluent | 0 | 0 | 0 | 720.9 | 0 | 0 | 0 | 0 | 0 |
| HCl | 117 | 0 | 0 | 0 | 0 | 0 | 0 | 0 | 0 |
| NaCl | 0 | 58.6 | 58.6 | 0 | 0 | 0 | 0 | 0 | 0 |
| DEHPA | 0 | 0 | 0 | 48.6 | 0 | 0 | 0 | 0 | 0 |
| TBP | 0 | 0 | 0 | 48.95 | 0 | 0 | 0 | 0 | 0 |
| NaOH | 0 | 0 | 0 | 0 | 0 | 0 | 120 | 120 | 0 |

These results indicate that the process of the present invention may be advantageously utilized to extract and recover metal values from ore residues, and in particular to extract and recover radioactive metal values from tantalum and niobium containing ore residues.

It should be clearly understood that the forms of the present invention herein described are illustrative only and are not intended to limit the scope of the invention.

The invention claimed is:

1. A process for selectively extracting scandium values from an ore residue comprising scandium, fluorine, tantalum, and/or niobium, the process comprising the steps of:
    a1) reacting the ore residue with a solution of a first mineral acid for a period of time, and under temperature and pressure conditions sufficient, to solubilize at least a portion of tantalum and niobium from the source material and create a solution comprising tantalum and niobium metal values and a solids residue comprising fluorine and scandium metal values and at least partially depleted in tantalum and niobium metal values:
    a2) separating and drying the solids residue generated in step a1);
    a3) reacting the solids residue from step a2) with a second mineral acid comprising sulfuric acid for a period of time, and under temperature and pressure conditions sufficient, to liberate hydrogen fluoride gas and to generate a sulfated material comprising scandium metal values and at least partially depleted in fluorine metal values; and
    a4) leaching the sulfated material to solubilize scandium metal values contained in the sulfated material and generate said aqueous solution comprising scandium metal values and a solid phase at least partially depleted in scandium metal values; and
    b) selectively extracting a scandium value from said aqueous solution.

2. The process of claim 1 wherein the first mineral acid in step a1) comprises sulfuric acid.

3. The process of claim 2 wherein step b) of extracting a scandium metal value from said aqueous solution comprises:
    b1) contacting said aqueous solution with an organic medium which includes a diluent and an extractant, said diluent being immiscible with said aqueous solution thereby producing an organic phase comprising scandium metal values and a raffinate at least partially depleted in scandium metal values; and
    b2) contacting said organic phase generated in step b1) with a scandium stripping agent to form a scandium phase comprising at least a portion of the scandium metal values present in said organic phase; an additional aqueous phase comprising said scandium stripping agent; and a final organic phase at least partially depleted in scandium metal values.

4. The process of claim 3, wherein the organic medium of step b1) comprises DEPHA (Di 2-ethylhexylphosphoric acid) as an extractant and an aliphatic non-soluble $C_9$–$C_{16}$ hydrocarbon as a diluent.

5. The process of claim 4 wherein the scandium stripping agent of step b2) comprises sodium hydroxide.

6. A process for selectively extracting scandium values from a source material comprising scandium, fluorine, tantalum, and/or niobium, the process comprising the steps of:
    a1) reacting the source material with a solution of a first mineral acid for a period of time, and under temperature and pressure conditions sufficient, to solubilize at least a portion of tantalum and niobium from the starting material and create a solution comprising tantalum and niobium metal values and a solids residue comprising fluorine and scandium metal values, and at least partially depleted in tantalum and niobium metal values;
    a2) separating and drying the solids residue
    a3) reacting the solids residue with a second mineral acid comprising sulfuric acid for a period of time, and under temperature and pressure conditions sufficient, to liberate hydrogen fluoride gas and to generate a sulfated material comprising scandium metal values and at least partially depleted in fluorine metal values; and
    a4) leaching the sulfated material to solubilize scandium metal values contained in the sulfated material and generate said aqueous solution comprising scandium metal values and a solid phase at least partially depleted in scandium; and
    b) selectively extracting a scandium value from said aqueous solution.

7. The process of claim 6, wherein the step a4) of leaching the sulfated material comprises the steps of:
    a4a) reacting the sulfated material with water for a period of time, and under temperature and pressure conditions sufficient to generate said aqueous solution comprising solubilized scandium metal values; and
    a4b) filtering said aqueous solution comprising solubilized scandium metal values to separate remaining material solids from said aqueous solution.

8. The process of claim 7 wherein step b) of selectively extracting a scandium metal value from said aqueous solution comprising solubilized scandium metal values comprises the steps of:
    b1) contacting said aqueous solution comprising solubilized scandium metal values with an organic medium which includes a diluent and an extractant, said diluent being immiscible with said aqueous solution, thereby producing an organic phase comprising scandium metal values and an aqueous raffinate phase at least partially depleted in scandium metal values;

b2) separating said organic phase from said raffinate phase;

b3) stripping scandium from said organic phase by contacting said organic phase with a scandium stripping agent, said scandium stripping forming a phase comprising scandium from said resultant organic phase and an aqueous phase comprising said scandium stripping agent and a final organic phase.

9. A process for selectively extracting a metal value from a source material which includes fluorine and one or more solubilizable metal values, the solubilizable metal values including tantalum or niobium metal values, the process comprising the steps of:

a) reacting the source material with a solution of a first mineral acid for a period of time, and under temperature and pressure conditions sufficient, to solubilize at least a portion of the tantalum or niobium metal values from the source material;

b) separating and drying the undissolved material;

c) reacting the undissolved material from step b) with a second mineral acid comprising sulfuric acid for a period of time, and under temperature and pressure conditions sufficient to liberate hydrogen fluoride gas and to generate a sulfated material;

d) leaching the sulfated material from step c) to solubilize at least a portion of the metal values contained therein and generate an aqueous solution comprising said solubilized metal values and a solid phase at least partially depleted in the solubilized metal values; and e) selectively extracting a solubilized metal value from said aqueous solution.

10. The process of claim 9, wherein step d) of leaching the sulfated material further comprises:

d1) reacting the sulfated material with water for a period of time, and under temperature and pressure conditions sufficient to generate said aqueous solution comprising the one or more other solubilized metal values; and d2) filtering said aqueous solution comprising the one or more other solubilized metal values to separate remaining material solids from said aqueous solution.

11. A process for selectively extracting a scandium metal value from an ore reside from a tantalum production process which includes fluorine, scandium and one or more additional solubilizable metal values, the additional solubilizable metal values include tantalum or niobium metal values, the process comprising the steps of:

a) reacting the ore residue with a sulfuric acid solution to solubilize at least a portion of the tantalum or niobium metal values from the ore residue and produce an undissolved material;

b) separating the undissolved material from step a);

c) separating and removing fluorine values from the ore residue by reacting the undissolved material from step b) with sulfuric acid for a period of time, and under temperature and pressure conditions sufficient to liberate hydrogen fluoride gas and to generate a sulfated material;

d) leaching the sulfated material from step c) in water to solubilize at least a portion of the scandium metal values contained therein and generate an aqueous solution comprising said solubilized scandium metal values and a solid phase at least partially depleted in the scandium solubilized metal values;

e) selectively extracting solubilized scandium metal values from said aqueous solution generated in step d) by contacting said aqueous solution with a sodium hydroxide stripping agent to produce a solid phase comprising scandium metal values and separating the solid phase from the remaining aqueous solution; and f) drying and recovering the scandium metal values.

12. A process for selectively extracting scandium metal values from a source material comprising scandium, fluorine, tantalum and/or niobium metal values the process comprising the steps of:

a) reacting the source material with a solution of a first mineral acid for a period of time, and under temperature and pressure conditions sufficient to solubilize tantalum and niobium into solution and thereby generate a solution comprising tantalum and/or niobium metal values, and a remaining material at least partially depleted in tantalum and/or niobium and comprising fluorine and/or scandium metal values;

b) separating and drying the remaining material;

c) reacting the remaining material with a second mineral acid for a period of time, and under temperature and pressure conditions sufficient to liberate hydrogen fluoride gas and to generate a sulfated material at least partially depleted in fluorine metal values and comprising scandium metal values;

d) reacting the sulfated material with water for a period of time, and under temperature and pressure conditions sufficient to generate an aqueous solution comprising scandium metal values;

e) filtering said aqueous solution comprising scandium metal values to separate remaining material solids from the aqueous solution;

f) contacting said aqueous solution resulting from step e) comprising solubilized scandium metal values with an organic medium which includes a diluent and an extractant, said diluent being immiscible with said aqueous solution resulting from step e), thereby producing an organic phase comprising scandium metal values and an aqueous raffinate phase at least partially depleted in scandium metal values;

g) separating said organic phase from step f) comprising scandium metal values from said raffinate phase at least partially depleted in scandium metal values;

h) stripping scandium metal values from said organic phase by contacting said organic phase from step g) with a scandium stripping agent, said stripping forming a scandium phase comprising scandium metal values from said organic phase, an aqueous phase comprising said scandium stripping agent and a final organic phase comprising said diluent and said extractant.

13. A process for selectively extracting scandium metal values from a sulfated starting material which includes scandium metal values comprising the steps of:

a) reacting the sulfated material with water for a period of time, and under temperature and pressure conditions sufficient to generate an aqueous solution comprising scandium metal values;

b) filtering said aqueous solution comprising scandium metal values from step a) to separate material solids from the aqueous solution;

c) contacting said aqueous solution from step b) comprising solubilized scandium metal values with an organic medium which includes a diluent and an extractant, said diluent being immiscible with said aqueous solution, thereby producing an organic phase comprising scandium metal values and an aqueous raffinate phase at least partially depleted in scandium metal values;

d) separating said organic phase comprising scandium metal values generated in step c) from said raffinate phase at least partially depleted in scandium metal values;

e) stripping scandium metal values from said organic phase by contacting said organic phase from step d) with a scandium stripping agent, said stripping forming a scandium phase comprising scandium metal values from said organic phase, and aqueous phase comprising said scandium stripping agent and a final organic phase comprising said diluent and said extractant.

* * * * *

UNITED STATES PATENT AND TRADEMARK OFFICE
CERTIFICATE OF CORRECTION

PATENT NO. : 7,282,187 B1          Page 1 of 1
APPLICATION NO. : 08/621631
DATED : October 16, 2007
INVENTOR(S) : Patrick M. Brown et al.

It is certified that error appears in the above-identified patent and that said Letters Patent is hereby corrected as shown below:

Title Page item 73 - should read
Assignee: CABOT CORPORATION

Signed and Sealed this

Seventeenth Day of June, 2008

JON W. DUDAS
*Director of the United States Patent and Trademark Office*